United States Patent [19]

Miyamoto

[11] Patent Number: 5,715,249
[45] Date of Patent: Feb. 3, 1998

[54] ATM CELL FORMAT CONVERTER USING CELL START INDICATOR FOR GENERATING OUTPUT CELL PULSE

[75] Inventor: Akihiro Miyamoto, Tokyo, Japan

[73] Assignee: NEC Corporation, Tokyo, Japan

[21] Appl. No.: 551,809

[22] Filed: Nov. 7, 1995

[30] Foreign Application Priority Data

Nov. 7, 1994 [JP] Japan ................... 6-272176

[51] Int. Cl.$^6$ .................................................. H04Q 11/04
[52] U.S. Cl. ........................... 370/395; 370/466; 370/474
[58] Field of Search ................................ 370/395, 397, 370/419, 463, 465, 466, 467, 468, 471, 474

[56] References Cited

U.S. PATENT DOCUMENTS

| | | | |
|---|---|---|---|
| 5,341,376 | 8/1994 | Yamashita | 370/466 |
| 5,353,284 | 10/1994 | Shiobara | 370/463 |
| 5,428,609 | 6/1995 | Eng et al. | 370/395 |
| 5,519,708 | 5/1996 | Van Der Veen | 370/474 |
| 5,521,915 | 5/1996 | Dieudonne et al. | 370/474 |

*Primary Examiner*—Douglas W. Olms
*Assistant Examiner*—Shick Hom
*Attorney, Agent, or Firm*—Sughrue, Mion, Zinn, Macpeak & Seas, PLLC

[57] ABSTRACT

An ATM cell format converter comprises conversion memory having a plurality of addresses for temporarily storing an ATM cell so as to perform ATM cell-format conversion. The ATM cell is separated into a plurality of data blocks and written into the addresses of the conversion memory together with indicators including a first indicator for indicating the beginning one of the data blocks in the ATM cell and a plurality of second indicators for indicating the other data blocks which follow the beginning data block in the ATM cell. The stored data blocks are read out from the conversion memory to form a converted ATM cell having, as the beginning data block in the converted ATM cell, one of the data blocks read out together with the first indicator. Alternatively, the indicators may be stored in another memory having a plurality of addresses corresponding to the addresses of the conversion memory.

3 Claims, 5 Drawing Sheets

ATM CELL FORMAT CONVERTER USING CELL START INDICATOR FOR GENERATING OUTPUT CELL PULSE

BACKGROUND OF THE INVENTION

The present invention relates to conversion of ATM (asynchronous transfer mode) cell format and, in particular, to solution of timing error in the conversion.

An ATM cell is a piece of data having a fixed bit length and comprises a header for containing a destination address and an information field for containing information to be transferred. The ATM cell can be conveniently handled as a data packet.

According to the ITU-TS (International Telecommunication Union, Telecommunication Standardization Sector), the ATM cell in the user-network interface comprises the header of 5 bytes and the information field of 48 bytes, as specified in I.361. Therefore, the ATM cell has a total of 53 bytes.

Further, an SDH (synchronous digital hierarchy) frame format is recommended for transferring the ATM cells, in ITU-TS, I.121.

Since the SDH frame is known in the art, it is omitted for the purpose of simplification to describe the SDH frame in detail. However, it is only pointed out that the SDH frame comprises two portions of a header and a payload. The header comprises a section over head and a path overhead POE which are collectively referred to as SPOH hereinafter. A plurality of ATM cells to be transmitted are contained in and carried by the payload through the network.

In user equipments, the ATM cell often has an extra or redundant byte for a special use. However, the redundant byte must be removed at the user-network interface.

Further, in the user's equipments, the SDH frame is often treated to carry the ATM cells in the SPOH as well as the payload. The ATM cells carried in the SPOH must be transferred into the payload.

Accordingly, it will be noted that conversion of ATM cell format is often required at the user-network interface.

An ATM cell format converter known in the prior art uses a memory as a conversion memory. An ATM cell is separated into a plurality of data blocks which are written into a plurality of addresses in the conversion memory, one after another. The writing is started by an input cell pulse which indicates a start or beginning of the ATM cell. Then, the data blocks written are read out from the conversion memory one after another and are arranged to form a read out ATM cell. A start or beginning one of the data blocks is determined by an output cell pulse produced in an external processing circuit. Therefore, when the output cell pulse erroneously comes out of phase, the read out ATM cell is not correct but contains the-data blocks to be separately in adjacent two ATM cells.

SUMMARY OF THE INVENTION

It is an object of the present invention to provide an ATM cell-format converting device wherein the output cell pulse can be produced in synchronism with reading out the beginning one of the data blocks in the ATM cell so as to remove erroneous timing difference of the output cell pulse and the beginning data block read out.

According to the present invention, an ATM cell format converting device is obtained which comprises: conversion memory means having a plurality of addresses each having N-bits for temporarily storing an ATM cell so as to perform ATM cell-format conversion; applying means for separating the ATM cell into a plurality of data blocks each having M-bits to apply the data blocks to the memory means; writing address generating means for generating addresses in the conversion memory means to which the data blocks should be written, respectively; writing means for writing the data blocks into the addresses of the conversion memory means together with indicators including a first indicator for indicating a beginning one of the data blocks in the ATM cell and a plurality of second indicators for indicating the other data blocks following the beginning data block in the ATM cell; reading address generating means for generating reading addresses in the conversion memory means from which the data blocks should be read out; and reading means for reading out the data blocks at the reading addresses in the conversion memory means to handle, as the beginning data block in the ATM cell, that one of the data blocks read out together with the first indicator.

According to another aspect of the present invention, an ATM cell format converting device is obtained which comprises: conversion memory means having a plurality of addresses for temporarily storing an ATM cell so as to perform the ATM cell-format conversion; an indicator memory having a plurality of addresses corresponding to the addresses in the conversion memory means for storing a first indicator for indicating a beginning position of the ATM cell, the indicator memory having addresses; applying means for separating the ATM cell into a plurality of data blocks each having a predetermined number of bits to apply the data blocks to the conversion memory means; writing address generating means for generating writing addresses in the conversion memory to which the data blocks should be written, respectively; writing means for writing the data blocks into the writing addresses of the conversion memory means and writing the first indicator in the indicator memory at an addresses corresponding to that one of the writing addresses in the conversion memory means to which the beginning data block is written, with second indicators being written in the indicator memory at the other addresses corresponding to the addresses in the conversion memory means to which the other data blocks following the beginning data block in the ATM cell are written; reading address generating means for generating reading addresses in the conversion memory means from which the data blocks should be read out; and reading means for reading out the data blocks at the reading addresses in the memory means and reading out the indicators from the indicator memory at the addresses corresponding to the reading addresses to handle, as the beginning data block in the ATM cell, that one of the data blocks read out together with the first indicator at a same time.

In those ATM cell format converting devices described above according to the present invention, the ATM cell-format conversion performed is a conversion from a state where ATM cells are held in a header portion and a payload portion in a SDH frame to another state where the ATM cells are held in the payload portion alone in the SDH frame.

DESCRIPTION OF PREFERRED EMBODIMENTS

Prior to description of preferred embodiments of the present invention, the prior art will be described for sake of the better understanding of the present invention.

Figure 1:
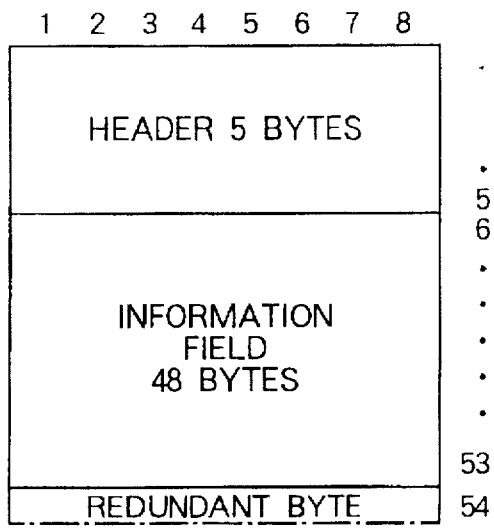
FIG. 1 is a schematic diagram illustrating an ATM structure.

Referring to FIG. 1, there is shown a structure of the ATM cell in the user-network interface as described in the preamble.

The ATM cell shown therein has a total of 53 bytes and comprises the header of 5 bytes and the information field of 48 bytes. The redundant byte is also shown by an imaginary line.

Figure 2:
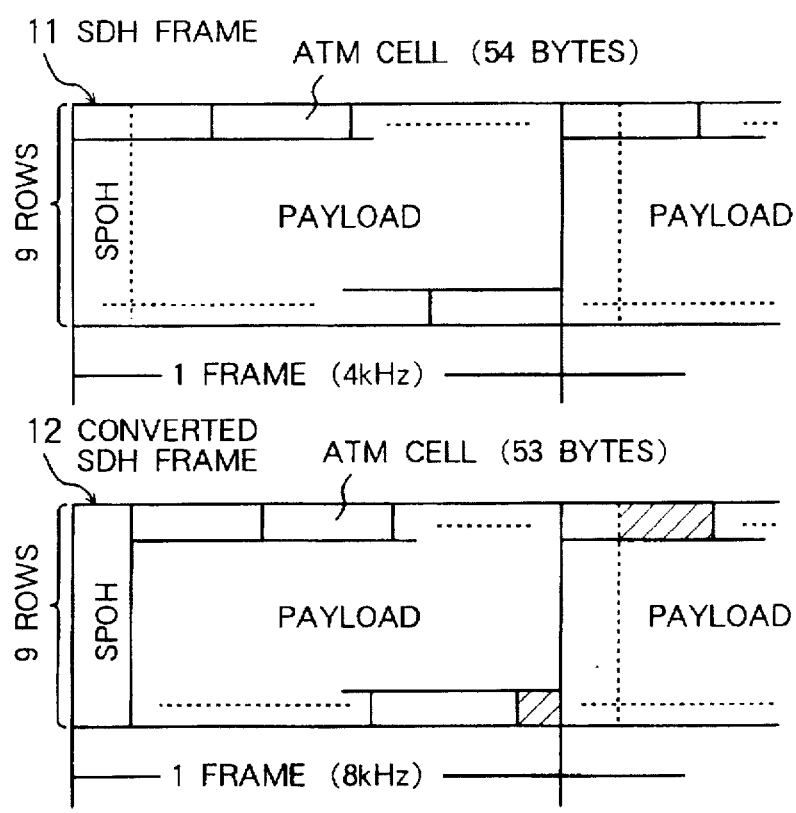
FIG. 2 illustrates an SDH frame used in a user's equipment and a converted SDH frame carrying ATM cells.

Referring to FIG. 2, a known ATM cell conversion is illustrated. In detail, the SDH frame 11 in a user's equipment is shown to carry the ATM cells in the SPOH as well as the payload. Each of the ATM cells has 54 bytes.

For example, according to the STM-1 (synchronous transport module-1) frame format, the SDH frame 11 has 9 byte rows, each row having 270 bytes. Accordingly, it will be understood that the SDH frame 11 shown has 45 ATM cells. In the SDB frame 11, each of the 9 byte rows is shown to have a 4 kHz bit length.

At the user-network interface, the ATM cells carried in the SPOH must be transferred into the payload by ATM cell format converter. The converted SDH frame 12 is shown to have ATM cells in the payload only but not in the SPOH. Each of the ATM cells has 53 bytes.

Figure 3:
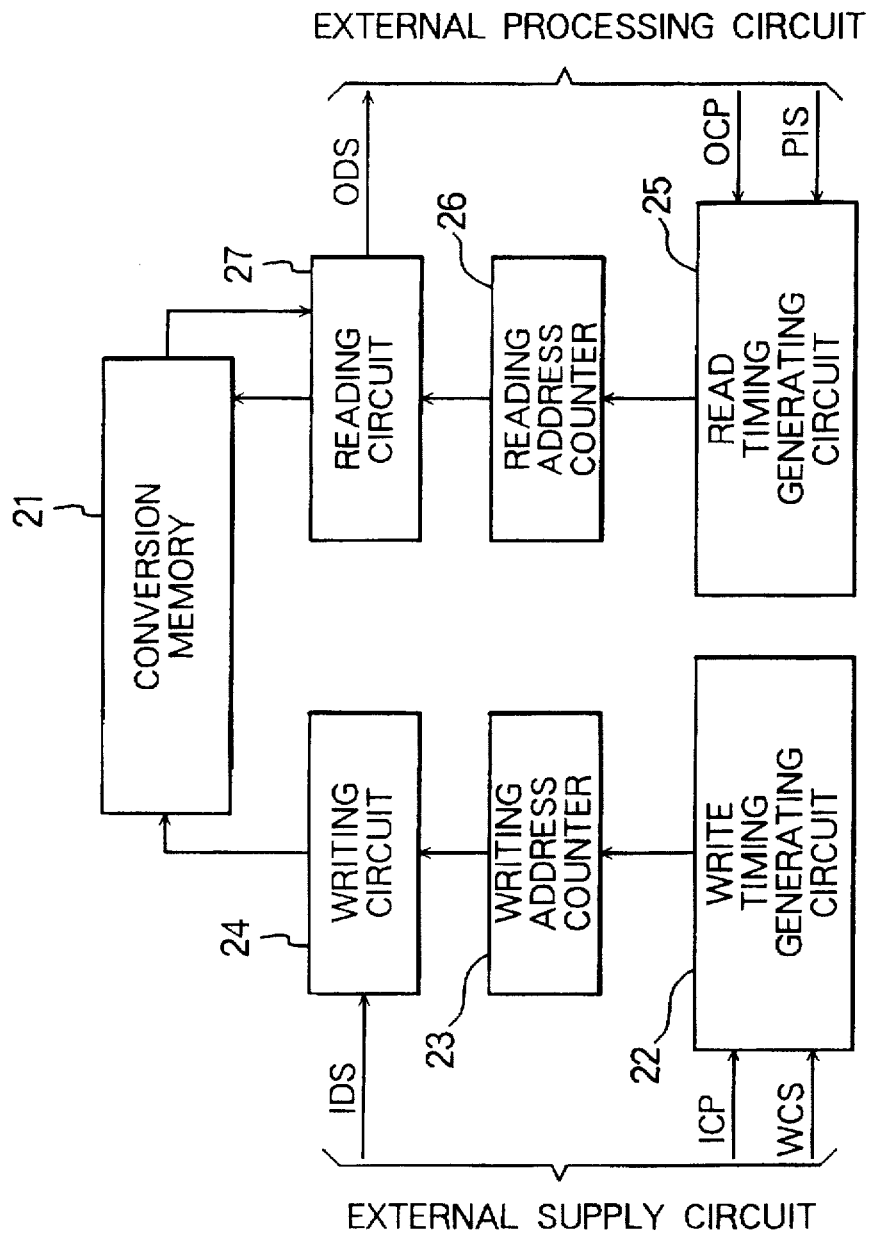
FIG. 3 is a block diagram illustrating a known ATM cell format converter.
Figure 4:
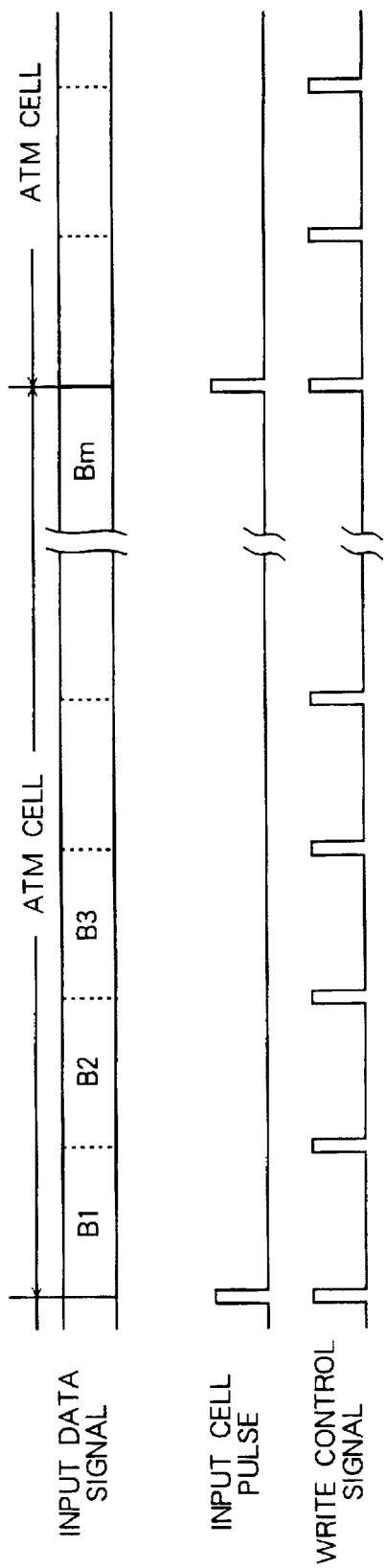
FIG. 4 is a view of various signals for writing ATM cells into a conversion memory in FIG. 3.
Figure 5:
FIG. 5 is a view of various signals for reading ATM cells from the. conversion memory in FIG. 3.

Referring to FIGS. 3, 4, and 5, an ATM cell format converter known in the prior art and its operation will be described for the conversion shown in FIG. 2.

The known ATM cell format converter shown in FIG. 3 therein uses a memory as a conversion memory 21 for temporarily storing an ATM cell to be converted as a plurality of data blocks separated each having a predetermined number of data bits.

At a writing side of the conversion memory 21, there are provided a write timing generating circuit a writing address counter 23, and a writing circuit 24.

The converter receives from an external supply circuit ATM cells, as input data signal (IDS) to be converted, one after another, together with an input cell pulses (ICP) and a write control signal (WCS). The time relation of these signals are illustrated in FIG. 4.

Each of the input cell pulses indicates a start or beginning of each of the ATM cells of the input data signal. The write control signal is for generating a timing signal which determines a timing for writing the input data signal into the conversion memory 21 and for generating a writing address.

Upon first receiving the input cell pulse, the write timing generating circuit 22 resets the content in the writing address counter 23. The writing address counter 23 generates a writing address of "0". When the writing circuit 24 receives the input data signal and the writing address of "0", the writing circuit writes a beginning one (B1) of the data blocks of the ATM cell into "0" address of the conversion memory 21. Thereafter, the write timing generating circuit 22 increments the content in the writing address counter 23 in response to subsequent reception of the write control signal. Thus, the writing circuit 24 writes the subsequent data blocks of the ATM cell in different addresses in the conversion memory 21 one after another as shown by B2, B3, . . . Bm in FIG. 4.

It will be noted that a repetition period of the write control signal is selected to determine a predetermined bit length of each for the data blocks written in different addresses in the conversion memory.

Thus, ATM cell is stored in the conversion memory 21 as a plurality of data blocks of the ATM signal.

Then, the stored ATM cell is read out from the conversion memory 21 to form an output data signal (ODS) which provides an ATM cell format converted signal.

At a reading side of the conversion memory, there are a read timing generating circuit 25, a reading address counter 26 and reading circuit 27.

The reading circuit 27 reads the data blocks stored in the conversion memory 21 in response to reading addresses delivered from the read timing generating circuit 25. That is, upon receiving a SDH payload indication signal (PIS) which indicates the payload portion of the converted SDH frame (12 in FIG. 2) and an output cell pulse (OCP) which indicates a start or beginning of an ATM cell in the output data signal. The output data signal is supplied to an external processing circuit and is processed therein into the converted signal. The external processing circuit supplies the SDH payload indication signal and the output cell pulse. The time relation of those signals is shown in FIG. 5.

Upon first receiving the SDH payload indication signal and the output cell signal, the read timing generating circuit 25 starts control of a read address counter 26 and periodically delivers thereto read timing pulses. The reading address counter 26 generates reading addresses incremented by the read timing pulses from the read timing generating circuit 25. Thus, the plurality of data blocks stored in the conversion memory 21 are read out to provide the output data signal.

Then, subsequent data blocks B1, B2, . . . , Bm' in the output data signal are treated as a converted ATM signal with B1 as a start one as shown in FIG. 5.

Temporarily referring to FIG. 2, considering that the ATM cell in the converted SDH frame has 53 bytes, it is noted that reading of the redundant byte is not carried out in the reading operation.

The above operation is repeated for subsequent ATM cells as shown in FIGS. 4 and 5. Thus, the converted SDH frame 12 is obtained.

In the known device, the cell format conversion can be performed without error if the input and output cell pulses are supplied with correct timing.

In the known device, the timing of the reading address is determined by application of the output cell pulse. Therefore, when application of the output cell and the beginning data block in the ATM cell are out of phase with each other as shown by an incorrect output pulse P and a correct pulse P' shown by a dotted line, the ATM cell cannot be formed at the reading side, as shown by cell 3 in FIG. 5. Thereafter, each of the cells determined by the output cell pulses contains data blocks in subsequent two adjacent ATM cells, so that the subsequent conversion cannot provide correctly converted ATM cells. Accordingly, it has sometimes been caused that data of one SDH frame, unfortnuately becomes meaningless.

Figure 6:
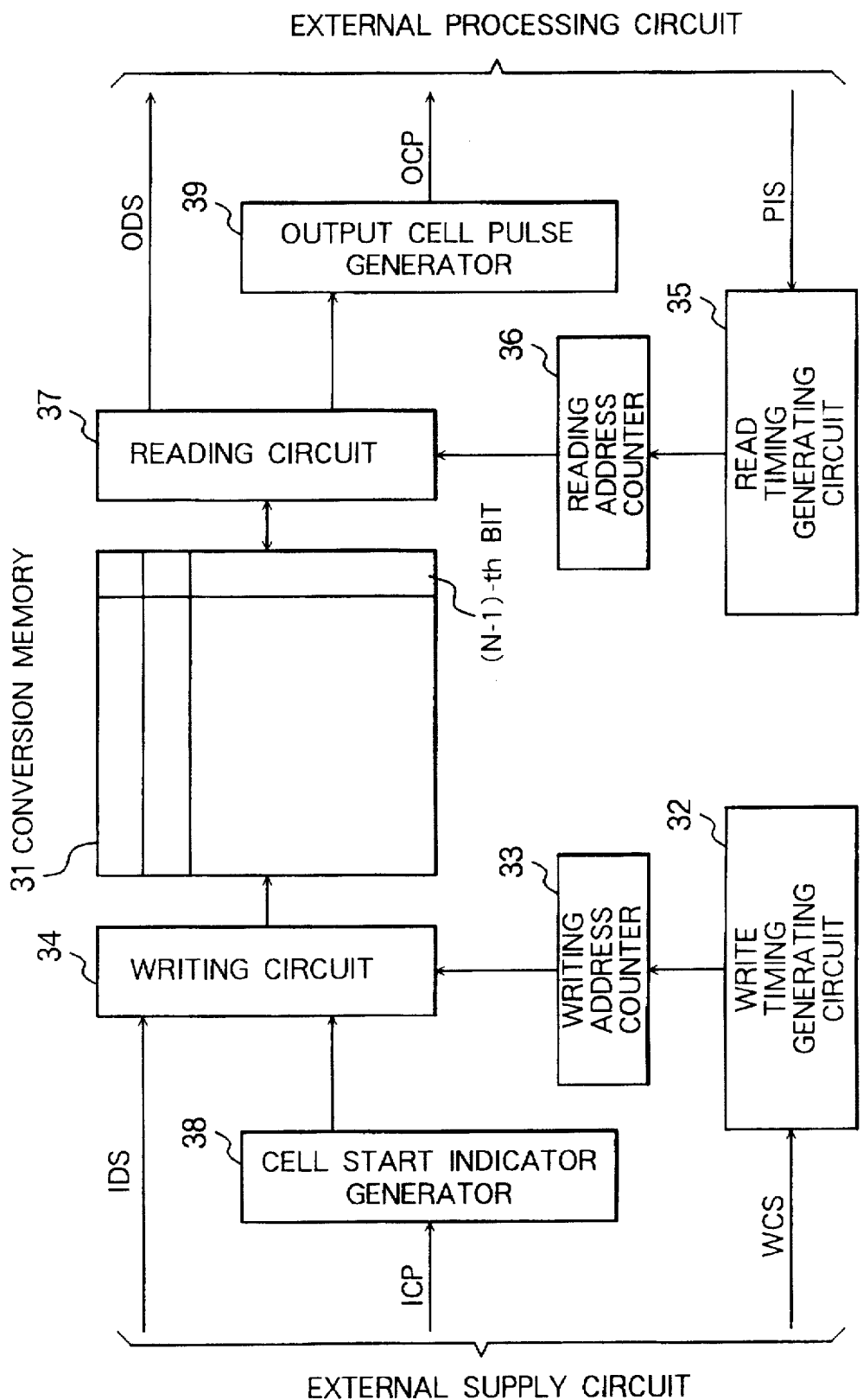
FIG. 6 is a block diagram of an ATM cell format converter according to an embodiment of the present invention.

Referring to FIG. 6, an ATM cell format converter according to an embodiment of the present invention is shown for performing a conversion from a state where ATM cells are held in a header portion and payload portion in a SDH frame (11 in FIG. 2) to a state where the ATM cells are held in the payload portion alone in the SDH frame (12 in FIG. 2).

The present converter is similar to the known converter in FIG. 3 except for some differences. Accordingly, the description of the present converter will be focused to those differences for the purpose of simplification.

The present converter comprises a conversion memory 31, a write timing generating circuit 32, a writing address counter 33, a writing circuit 34, a read timing generating circuit 35, a reading address counter 36, and a reading circuit 37 which correspond to blocks 21–27, respectively, in FIG. 3. The present converter is further provided with a cell start indicator generator 38 and an output cell pulse generator 39.

The conversion memory 31 is a memory having a plurality of addresses each having M-bits. The ATM cell is separated into a plurality of data blocks each having M bits (M<N). Each of the M-bit data blocks is written into zeroth through (M−1)-th bits of each address in the conversion memory 31. The addresses are given from the writing address counter 33 which is controlled by the write timing generating circuit 32 in the similar manner as in FIG. 3. However, the writing address counter 33 only receives a write control signal (WCS), not an input cell pulse (ICP), from the external supply circuit and generates the write timing signal in response to the write control signal and increments the writing address counter.

The input cell pulse (ICP) from the external supply circuit is applied to the cell start indicator generator 38 which generates a one-bit signal "1" in response to the input cell pulse. However, the cell start indicator generator 38 keeps its output at "0" level when the input cell pulse is absent. The output of the cell start indicator generator 38 is applied to the writing circuit 34 and is written into (N−1)-th bit position in one of the addresses In the conversion memory 31 upon writing operation for one of the data blocks into the one address by the writing circuit 34.

Thus, the data blocks of the ATM signal are stored in the conversion memory 31 together with the cell start indicator "1" accompanying the start one of the data blocks of the ATM cell.

The stored data blocks and the cell start indicators are read out from the conversion memory 31 by the reading circuit 37 in response to reading addresses which are given from the reading address counter 36.

Upon receiving a payload indicating signal (PIS), the read timing generating circuit 35 starts control of the read address counter 36.

The stored data blocks are read out from addresses in the conversion memory 31 subsequently together with the start indicator. Each of the data blocks read out from zeroth through (M−1)-th bit positions in each address is delivered as the output data signal (ODS) to the external processing circuit in the similar manner as in FIGS. 3 through 5. The cell start indicator read out from the (N−1)-th bit position in each of the addresses in the conversion memory 31 is applied to the output cell pulse generator 39 through the reading circuit 37. When the indicator is "1", the output cell pulse generator 39 generates an output cell pulse (OCP).

Accordingly, the external processing circuit receives the output data signal (ODS) and the output cell pulse together with the first one of the data blocks of the ATM cell, and can therefore arranges, as a start data block of the ATM cell, the data block corresponding to the output cell pulse with the next subsequent output data blocks following the start data block to form an ATM cell.

According to the present embodiment, the output cell pulse indicating the beginning or start data block of the ATM cell Is generated in response to the start indicator read out from the conversion memory 31 together with the start data block. Therefore, the start data block is always arranged at the beginning of the ATM cell. This means that the conversion of the ATM cell is not erroneously performal.

Figure 7:
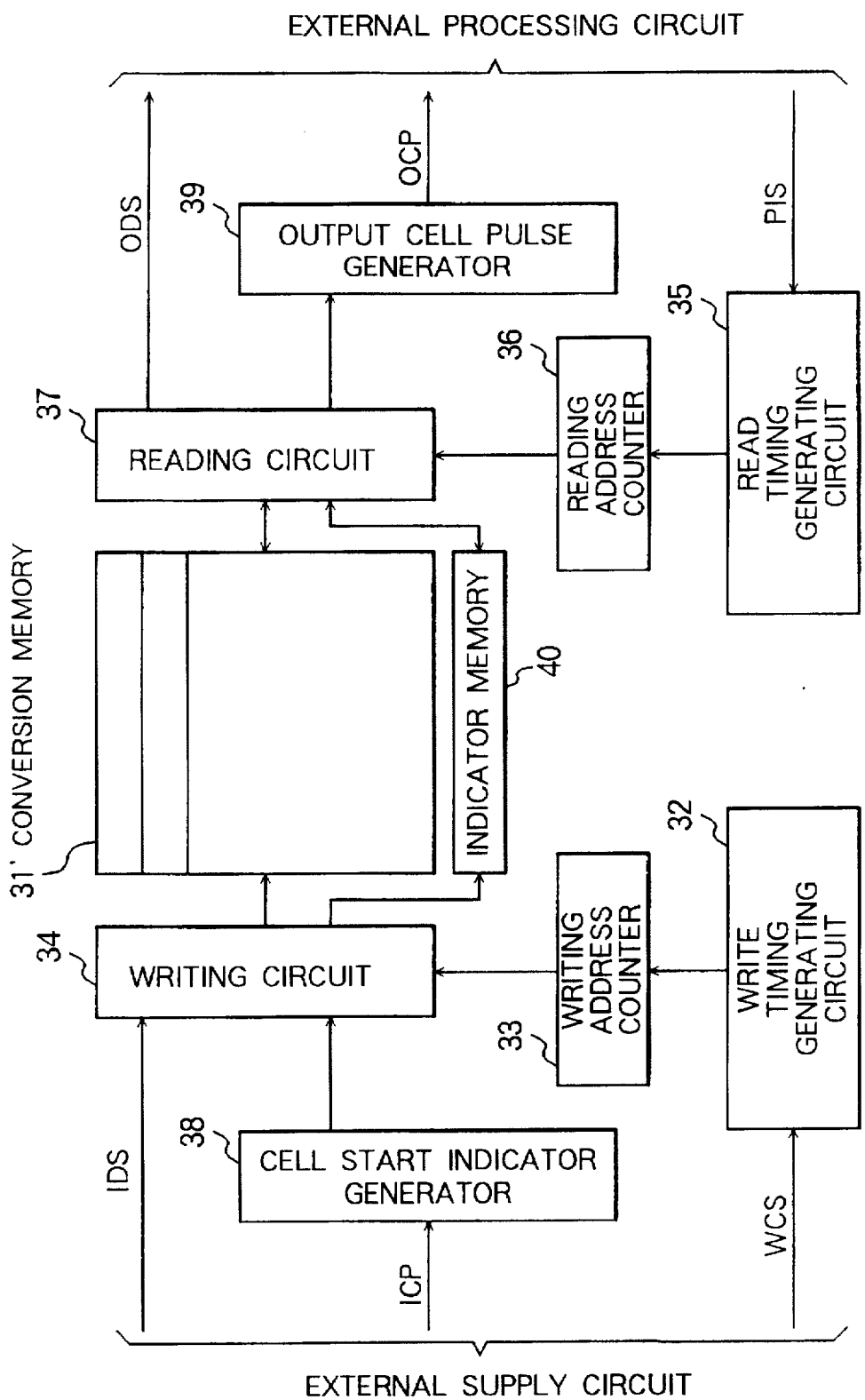
FIG. 7 is a block diagram of another embodiment of the present invention.

Referring to FIG. 7, an ATM cell format converter according to another embodiment shown therein is similar to the converter in FIG. 6 except that another memory 40 is provided for storing the cell start indicators without use of memory area in the conversion memory 31. Accordingly, conversion memory is represented by 31' in FIG. 7.

The cell start indicators from the cell start indicator generator 38 are written into the indicator memory 40 by the writing circuit 34. The cell start indicator stored in the indicator memory 40 are read out by the reading circuit 37 and delivered to the output cell pulse generator 39.

What is claimed is:

1. An ATM cell format converting device which comprises:

conversion memory means having a plurality of addresses each having N-bits for temporarily storing an ATM cell so as to perform ATM cell-format conversion;

applying means for separating the ATM cell into a plurality of data blocks, each of said plurality of data blocks having M bits, to apply the data blocks to said conversion memory means;

writing address generating means for generating a plurality of writing addresses of said conversion memory means for writing each of said plurality of data blocks to a respective one of said plurality of writing address;

writing means for writing each of said plurality of data blocks to a respective one of said plurality of writing addresses together with a cell start indicator, said cell start indicator being one of a first indicator for indicating a beginning data block of said plurality of data blocks and a plurality of second indicators for respectively indicating others of said plurality of data blocks which follow the beginning data block in the ATM cell;

reading address generating means for generating reading addresses of said conversion memory means for reading out each of said plurality of data blocks; and reading means for reading out each of said plurality of data blocks from the reading addresses so that said beginning data block is read out together with said first indicator and so that each of the others of said plurality of data blocks is read out together with a respective one of said plurality of second indicators.

2. An ATM cell format converting device which comprises:

conversion memory means having a first plurality of addresses for temporarily storing an ATM cell so as to perform the ATM cell-format conversion;

an indicator memory having a second plurality of addresses, corresponding to the first plurality addresses in the conversion memory means, for storing a first indicator for indicating a beginning position of the ATM cell;

applying means for separating the ATM cell into a plurality of data blocks, each of said plurality of data blocks having a predetermined number of bits, to apply the data blocks to said conversion memory means;

writing address generating means for generating a plurality of writing addresses of said conversion memory means for writing each of said plurality of data blocks to a respective one of said plurality of writing addresses;

writing means for writing each of said plurality of data blocks to a respective one of said plurality of writing addresses and for writing said first indicator in said indicator memory at one of said second plurality of addresses corresponding to the respective one of said plurality of writing addresses to which a beginning data block of said plurality of data blocks is written, with second indicators being written in the indicator memory at others of said second plurality of addresses, each of said others of said second plurality of addresses corresponding to a respective one of said plurality of writing addresses to which each of said others of said plurality of data blocks which follow the beginning data block in the ATM cell are written;

reading address generating means for generating reading addresses of said conversion memory means for reading out each of said plurality of data blocks from a respective one of said reading addresses; and reading means for reading out each of said plurality of data blocks at the reading addresses from said conversion memory means and reading out said first and second cell start indicators from said indicator memory from the respective ones of said second plurality of addresses which correspond to the respective ones of said reading addresses, so that the beginning data block is read out together with said first cell start indicator and so that said others of said plurality of data blocks are read out together with said second cell start indicators.

3. The ATM cell format converting device according to claims 1 or 2, wherein the ATM cell-format conversion is a conversion from a state in which ATM cells are held in a header portion and in a payload portion in a Synchronous Digital Hierarchy (SDH) frame to another state in which the ATM cells are held only in the payload portion in the SDH frame.

\* \* \* \* \*